United States Patent
Shintani

(10) Patent No.: US 7,324,829 B2
(45) Date of Patent: Jan. 29, 2008

(54) RADIO COMMUNICATION TERMINAL AND TRANSMISSION POWER CONTROL METHOD

(75) Inventor: Tatsuyuki Shintani, Tokyo (JP)

(73) Assignee: NEC Corporation, Tokyo (JP)

( * ) Notice: Subject to any disclaimer, the term of this patent is extended or adjusted under 35 U.S.C. 154(b) by 474 days.

(21) Appl. No.: 11/100,398

(22) Filed: Apr. 7, 2005

(65) Prior Publication Data
US 2005/0239490 A1 Oct. 27, 2005

(30) Foreign Application Priority Data
Apr. 12, 2004 (JP) ............... 2004-116916

(51) Int. Cl.
*H04B 7/00* (2006.01)
(52) U.S. Cl. .......... 455/522; 455/13.4; 455/67.11; 370/337; 375/259
(58) Field of Classification Search .......... 455/522, 455/13.4, 574, 127.1, 67.11, 115.1, 226.1; 370/337, 335; 375/259
See application file for complete search history.

(56) References Cited

U.S. PATENT DOCUMENTS

| | | | | |
|---|---|---|---|---|
| 6,169,761 B1* | 1/2001 | Marcoccia et al. | ......... | 375/132 |
| 6,327,312 B1* | 12/2001 | Jovanovich et al. | ........ | 375/316 |
| 6,894,996 B2* | 5/2005 | Lee | ............... | 370/337 |
| 6,978,149 B1* | 12/2005 | Morelli et al. | .............. | 455/522 |
| 7,245,678 B2* | 7/2007 | Tanaka | ................ | 375/347 |
| 2002/0044538 A1* | 4/2002 | Lee | ............... | 370/332 |
| 2004/0223467 A1* | 11/2004 | Hundal et al. | .............. | 370/328 |
| 2007/0195896 A1* | 8/2007 | Ichikawa | ............... | 375/259 |

OTHER PUBLICATIONS

Kota Kinoshita, Yasashii IMT-2000 (IMT-2000 Made Easy), The Telecommunications Association, 2001, pp. 42-47.

* cited by examiner

Primary Examiner—Matthew Anderson
Assistant Examiner—Minh Dao
(74) Attorney, Agent, or Firm—Sughrue Mion, Pllc.

(57) ABSTRACT

A cellular phone includes an inner loop portion and an outer loop portion both for conducting power control. The outer loop portion includes a timer counter. The timer counter transmits a timing signal to a communication quality comparing section when a set length of time elapses. The communication quality comparing section compares a block error rate (BLER) of received data with a target BLER even when a predetermined amount of data has not been received. When the BLER of the received data is equal to or higher than the target BLER, a target signal to interference power ratio (SIR) is decreased. Accordingly, the cellular phone can decrease the target SIR even when the amount of the received data is small, and no request for an unnecessarily high transmission power is made to a base station.

17 Claims, 6 Drawing Sheets

RADIO COMMUNICATION TERMINAL AND TRANSMISSION POWER CONTROL METHOD

BACKGROUND OF THE INVENTION

1. Field of the Invention

The present invention relates to a radio communication terminal and a transmission power control method, and more particularly to a radio communication terminal and a transmission power control method for a Wideband Code Division Multiple Access (hereinafter referred to as W-CDMA).

2. Description of the Related Art

In recent years, W-CDMA technologies have been developed as third-generation mobile communication means, and put into service. In W-CDMA, a cellular phone capable of performing power control includes an inner loop portion and an outer loop portion. The inner loop portion makes a request to a base station from which the cellular phone directly receives radio waves for an increase or a decrease in electric power at short time intervals (e.g., every 666 μs). The outer loop portion determines an appropriate power control reference value (i.e., a target signal to interference power ratio (hereinafter referred to as SIR)) based on a target quality value (e.g., an error rate) for predetermined long period (e.g., every several hundred milliseconds to several seconds). Such known art is disclosed in, for example, "Yasashii IMT-2000 (IMT-2000 Made Easy)" by Kota Kinoshita, Denki Tsuushin Kyokai (The Telecommunications Association), 2001, pp. 42-47.

FIG. 1 illustrates an exemplary circuit for conducting transmission power control (hereinafter referred to as TPC) in a known cellular phone. In an inner loop portion, a signal received by a radio transmitting/receiving section 100 is de-spread by a de-spreader 101, and then RAKE-combined by a RAKE receiving section 102. An SIR measuring section 107 measures a received SIR with regard to the RAKE-combined signal. An SIR comparing section 108 compares the received SIR with a target SIR. Based on the result of the comparison, a TPC bit generating section 109 outputs transmission power control information to the radio transmitting/receiving section 100. The information is transmitted to a base station. When the received SIR is lower than the target SIR, the inner loop portion transmits to the base station a request for an increase in the transmission power, while when the received SIR is equal to or higher than the target SIR, the inner loop portion transmits to the base station a request for a decrease in the transmission power.

In an outer loop portion, a long-time-interval quality measuring section 103 measures the communication quality on received data every time the received data reaches a predetermined amount. A quality comparing section 105 compares the measured communication quality with a target communication quality retained by a target quality information retaining section 104, sets a target SIR based on the result of the comparison, and transmits the target SIR to a target SIR retaining section 106. Alternatively, the target SIR retaining section 106 may set the target SIR based on the result of the comparison. When the measured communication quality is lower than the target communication quality (e.g., error rate of 1%) (i.e., the error rate is higher than 1%), the outer loop portion increases the target SIR by a predetermined amount, while when the measured communication quality is equal to or higher than the target communication quality, the outer loop portion decreases the target SIR by a predetermined amount.

Usually, a transmitting side divides a transmission information bit string per unit block, with an error check bit being added to each block. A receiving side receives a predetermined number of blocks, and calculates a block error rate (hereinafter referred to as BLER), i.e., a rate of blocks including an error. The BLER is included in the above-mentioned communication quality. For example, in packet communications, only a very small amount of data is received. This may require a long time to receive the predetermined number of blocks and to determine the BLER. Therefore, a high target SIR is maintained and a higher transmission power continues to be requested to the base station for the long time. Such a higher transmission power may result in increased interference with other users.

SUMMARY OF THE INVENTION

A radio communication terminal according to the present invention measures an SIR of a received signal, compares the measured SIR with a target SIR, and transmits TPC information to a base station based on a result of the comparison. The terminal includes a quality measuring section, a quality comparing section, a retaining section, and a counter section. The quality measuring section measures the communication quality of received data. The quality comparing section compares the measured communication quality and a target communication quality. The retaining section retains a target SIR updated based on the result of the comparison. The counter section outputs a timing signal to the quality comparing section. The quality comparing section compares the target communication quality with the communication quality measured when a predetermined amount of data is received. The quality comparing section compares the target communication quality with the communication quality measured when a timing signal is received from the counter section.

A transmission power control method according to the present invention includes the following steps of: measuring an SIR of a received signal; comparing the measured SIR with a target SIR; and transmitting TPC information to a base station based on a result of the comparison. The method further includes the steps of: measuring the communication quality of the received data when a predetermined amount of data is received; measuring the communication quality of the received data when a predetermined timing signal is received; comparing the measured communication quality with a target communication quality; and updating the target SIR based on a result of the comparison.

According to the present invention, even when the amount of the received data is small, the target SIR can be decreased by a timing signal outputted from the counter. Therefore, no request for an unnecessarily high transmission power is made to the base station. Further, since interference with other terminal devices is decreased, the capacity of the base station can be increased.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
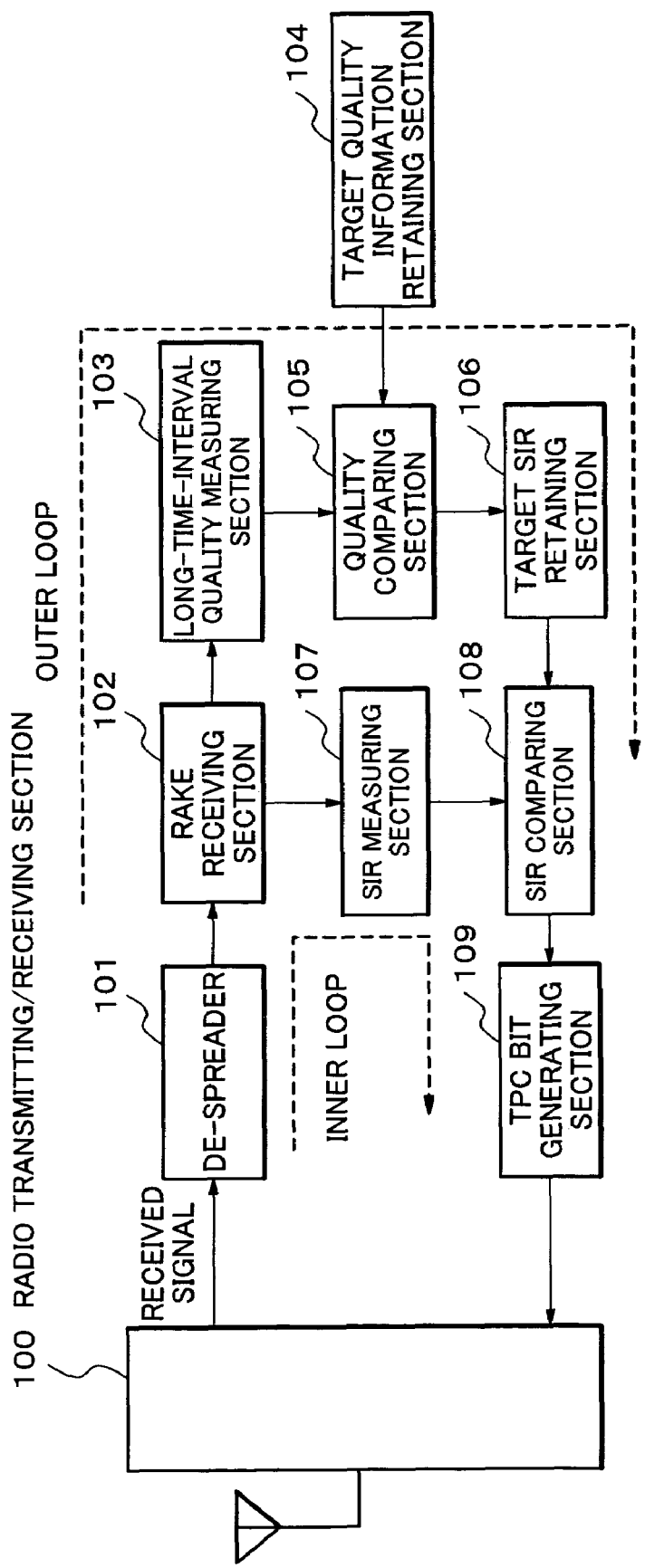
FIG. 1 is a block diagram of an exemplary prior-art radio communication terminal.
Figure 2:
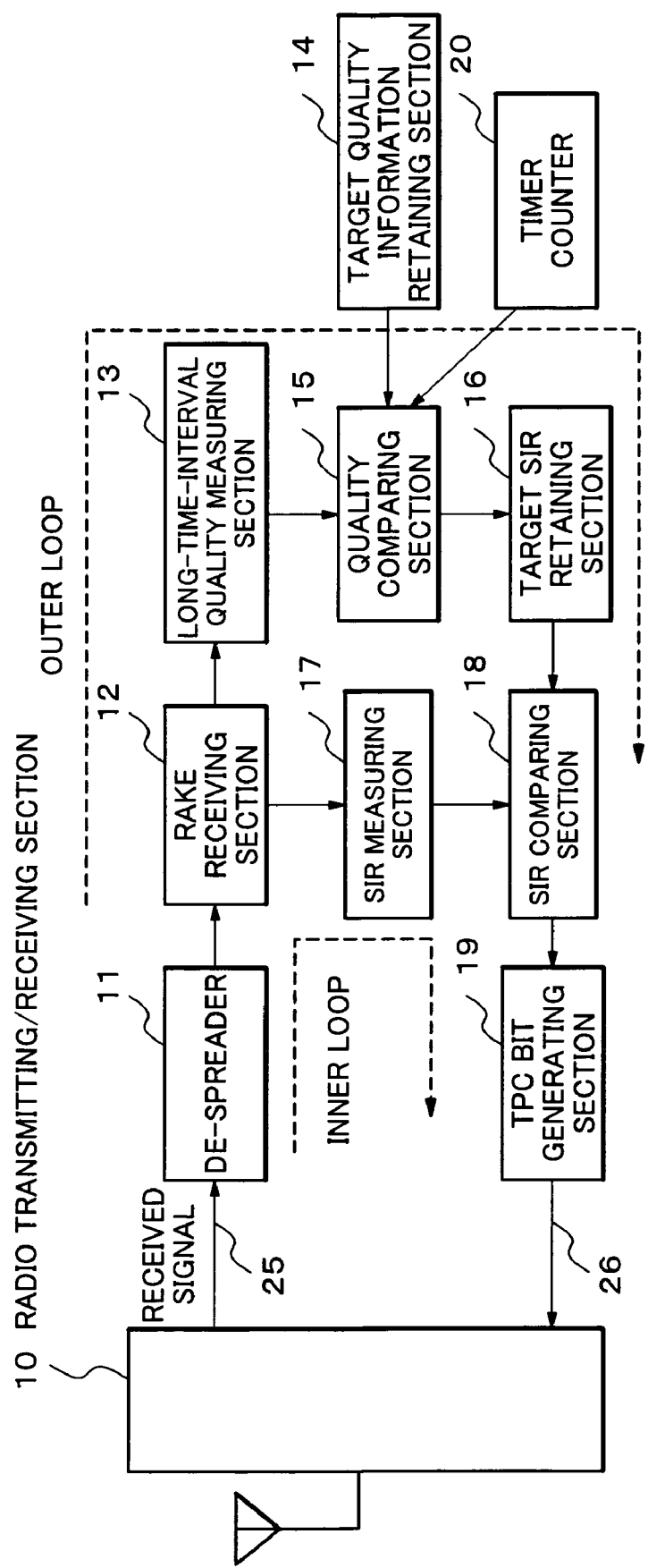
FIG. 2 is a block diagram of a radio communication terminal according to an embodiment of the present invention.

Preferred embodiments according to the present invention are described in the following. With reference to FIG. 2, a radio communication terminal includes a radio transmitting/receiving section 10, and has, in its inner loop portion, a de-spreader 11, a RAKE receiving section 12, an SIR measuring section 17, an SIR comparing section 18, and a TPC bit generating section 19. Further, the radio communication terminal has, in its outer loop portion, a long-time-interval quality measuring section 13, a target quality information retaining section 14, a quality comparing section 15, and a target SIR retaining section 16.

The radio transmitting/receiving section 10 receives a radio signal transmitted from a base station, demodulates the signal, and outputs a received signal 25 as a base-band signal. Further, the radio transmitting/receiving section 10 maps a TPC bit signal 26 outputted from the TPC bit generating section 19 into a transmission control channel, and transmits it to the base station together with other data to be transmitted. The de-spreader 11 de-spreads the received signal 25 based on a spread code sequence, and outputs the de-spread signal to the RAKE receiving section 12. The RAKE receiving section 12 combines the signal with multi path having varying delay times, demodulates the signal, and obtains a received data. The RAKE receiving section 12 outputs the received data to the long-time-interval quality measuring section 13 and the SIR measuring section 17.

The long-time-interval quality measuring section 13 measures the communication quality of the received data. More specifically, the long-time-interval quality measuring section 13 calculates a BLER based on cyclic redundancy check (hereinafter referred to as CRC) of the received data which is calculated by the RAKE receiving section 12. The calculated BLER is outputted to the quality comparing section 15. Further, when the number of blocks of the received data reaches a predetermined number, the long-time-interval quality measuring section 13 notifies the quality comparing section 15 to that effect. The target quality information retaining section 14 retains a target communication quality, i.e., a target BLER. A timer counter 20 counts a predetermined length of time, and after the predetermined length of time elapses, outputs a timing signal to the quality comparing section 15. It is to be noted that the length of time to be counted may be fixed or may be varied according to the communication quality of the received data measured by the long-time-interval quality measuring section 13. For example, the length of time to be counted is decreased when the communication quality of the received data is higher than the target communication quality. The length of time to be counted is increased when the communication quality of the received data is lower than the target communication quality. The length of time to be counted is maintained or decreased when the communication quality of the received data is equal to the target communication quality.

The quality comparing section 15 compares the communication quality of the received data (i.e., the quality of the received communication) with the target communication quality when a predetermined number of blocks are received or when a timing signal from the timer counter 20 is received. More specifically, the quality comparing section 15 compares the BLER outputted from the long-time-interval quality measuring section 13 with the BLER retained by the target quality information retaining section 14. The result of the comparison is outputted to the target SIR retaining section 16. Based on the result of the comparison, the target SIR retaining section 16 updates the target SIR and retains the updated target SIR. More specifically, for example, the target SIR retaining section 16 decreases the target SIR by a predetermined amount when the communication quality of the received data is higher than the target communication quality, while the target SIR retaining section 16 increases the target SIR by a predetermined amount when the communication quality of the received data is lower than the target communication quality. When the communication quality of the received data is equal to the target communication quality, the target SIR retaining section 16 may maintain or decrease the target SIR.

The SIR measuring section 17 measures a received SIR based on the received data outputted from the RAKE receiving section 12. Having been measured, the received SIR is outputted to the SIR comparing section 18. The SIR comparing section 18 compares the received SIR and the target SIR retained by the target SIR retaining section 16. The result of the comparison is outputted to the TPC bit generating section 19. Based on the result of the comparison, the TPC bit generating section 19 generates a TPC bit. More specifically, when the received SIR is higher than the target SIR, a TPC bit signal requesting for a decrease in the transmission power is transmitted to the base station, while when the received SIR is lower than the target SIR, a TPC bit signal requesting for an increase in the transmission power is transmitted to the base station. The TPC bit signal 26 is first outputted to the radio transmitting/receiving section 10 and then transmitted to the base station. When the received SIR is equal to the target SIR, the user may arbitrarily decide which one of a TPC bit signal including a request for an increase in the transmission power, a TPC bit signal including a request for a decrease in the transmission power, and a TPC bit signal including a request to maintain the present transmission power is to be transmitted.

As described in the above, the quality comparing section 15 compares the quality of the received communication with the target communication quality when a predetermined amount of data (the predetermined number of blocks) which was set for calculating the BLER is received or when the predetermined timing signal is outputted by the timer counter 20. The quality comparing section 15 may update the target SIR. In this case, the target SIR retaining section 16 does not update the target SIR, and only retains the target SIR updated by the quality comparing section 15.

Figure 3:
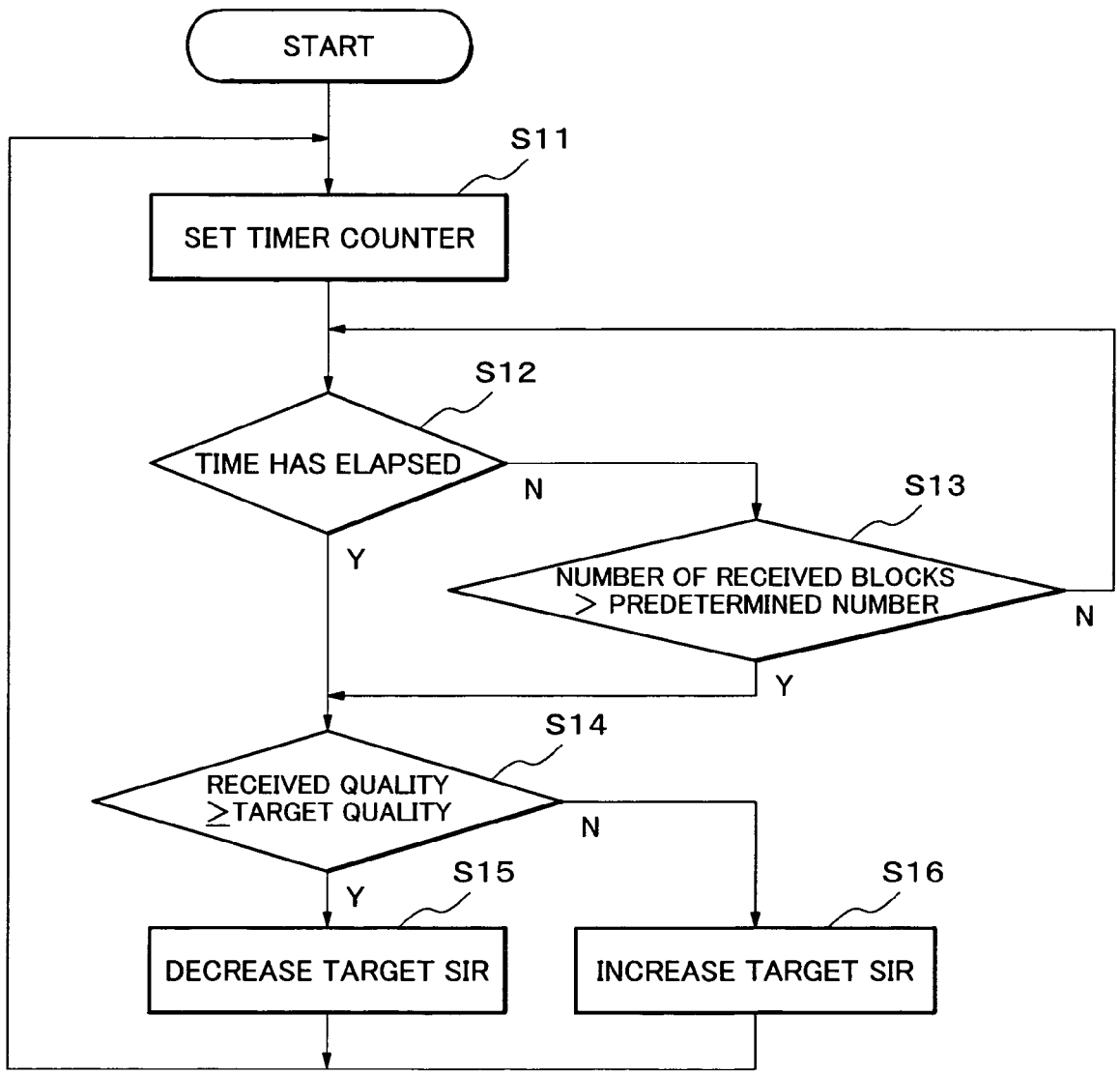
FIG. 3 illustrates an exemplary operation of the radio communication terminal according to the embodiment of the present invention.

With reference to FIG. 3 where an exemplary operation of the above-described radio communication terminal in the outer loop portion is illustrated, first, the timer counter is set (S11). The timer determines whether the predetermined length of time has elapsed or not (S12). When the predetermined length of time has not been expired ("NO" branch from S12), the long-time-interval quality measuring section 13 determines whether the predetermined number of blocks have been received or not (S13). When the predetermined number of blocks have been received ("YES" branch from S13), the long-time-interval quality measuring section 13 notifies the quality comparing section 15 to that effect. When the number of blocks has not reached the predetermined number ("NO" branch from S13), a determination whether the predetermined length of time has expired or not is made once again (S12). When the predetermined length of time has expired ("YES" branch from S12) or when the long-time-interval quality measuring section 13 transmits the above-described notification, the quality comparing section 15 compares the quality of the received communication with the target communication quality (S14). When the quality of the received communication is equal to or higher than the target communication quality (i.e., when the error rate of the received data is equal to or lower than the target error rate), the target SIR retaining section 1-6 decreases the target SIR and retains the new decreased target SIR (S15). When the quality of the received communication is lower than the target communication quality (i.e., when the error rate of the received data is higher than the target error rate), the quality comparing section 15 increases the target SIR and retains the new increased target SIR (S16). Then, the timer counter is reset. As described in the above, the target SIR is updated based on the power control in the outer loop portion.

On the other hand, the inner loop portion compares the target SIR set by the power control in the outer loop portion with the received SIR actually measured. When the received SIR is lower than the target SIR, the radio communication terminal transmits a request for an increase in the transmission power to the base station, and when the received SIR is higher than the target SIR, the radio communication terminal transmits a request for a decrease in the transmission power to the base station. When the received SIR is equal to the target SIR, any one of an increase in the transmission power, a decrease in the transmission power, and maintaining of the present transmission power may be selected as desired. According to the present invention, power control in the outer loop portion and power control in the inner loop portion are conducted simultaneously. As a result, the transmission power from the base station can be decreased while the target communication quality is reached.

Figure 4:
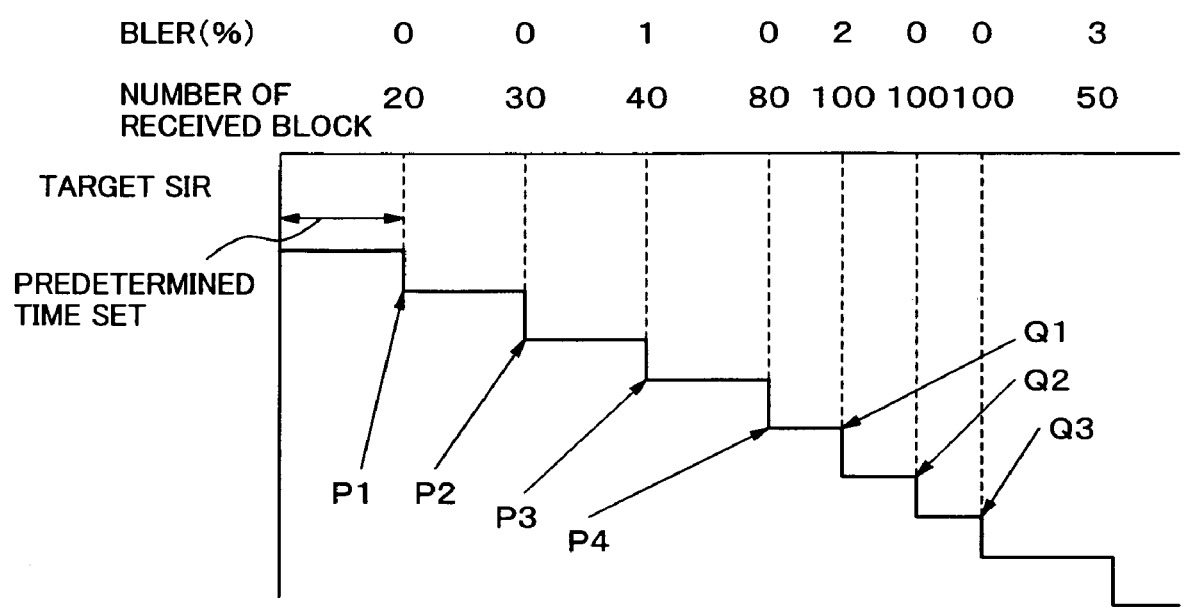
FIG. 4 illustrates an exemplary operation of the radio communication terminal according to the embodiment of the present invention.

Next, reference is made to FIG. 4 where an exemplary operation of the radio communication terminal is illustrated with a time chart. In FIG. 4, the y-axis represents the target SIR while the x-axis represents time. The BLER (%) of the received data and the number of the received blocks at respective times (P1, Q1, . . . ) are indicated along the x-axis. In the example shown in FIG. 4, the target communication quality (BLER) is 5%, and the BLER is measured when 100 blocks are received. First, the initial value of the target SIR is set. At the time (P1), the number of the received blocks is 20. Although the number of the received blocks has not reached 100, a predetermined time set in the timer counter 20 expires at P1. Therefore, at P1, the quality comparing section 15 receives a timing signal and compares the quality of the received communication with the target communication quality. At P1, the received BLER is 0%. Since the quality of the received communication is higher than the target communication quality, the quality comparing section 15 decides to decrease the target SIR. The quality comparing section 15 or the target SIR retaining section 16 updates the target SIR. In addition, at P2 where the predetermined time has elapsed, the quality comparing section 15 or the target SIR retaining section 16 decides to decrease the target SIR similarly to the case of P1. Further, similarly, the quality comparing section 15 or the target SIR retaining section 16 decreases the target SIR at P3 and P4. At P4, the number of the received blocks is still only 80, and at the same time, the quality of the received communication is higher than the target communication quality. Therefore, the target SIR is decreased, and the timer counter 20 restarts the count. At Q1, the predetermined time of the timer counter 20 has not expired yet. However, at Q1, the number of the received blocks has reached 100. Therefore, the quality comparing section 15 compares the quality of the received communication with the target communication quality. At Q1, the BLER is 2%, which is lower than the target value of 5%. Thus, the target SIR is decreased. In this example, at Q2, the time set in the timer counter 20 has not expired, but the number of the received blocks reaches 100 at Q2. Therefore, at Q2, the quality of the received communication is compared with the target communication quality and the target SIR is decreased. Similarly, at Q3, the target SIR is decreased. After that, the timer counter 20 restarts the count and the time expires. At that time, the BLER is 3% and the number of the received blocks is 50. Accordingly, the target SIR is decreased again. As described above, even when the number of the received data is small, the quality of the received communication is compared with the target communication quality every time the timer counter 20 counts the predetermined length of time. This increases the opportunities of decreasing the target SIR.

Figure 5:
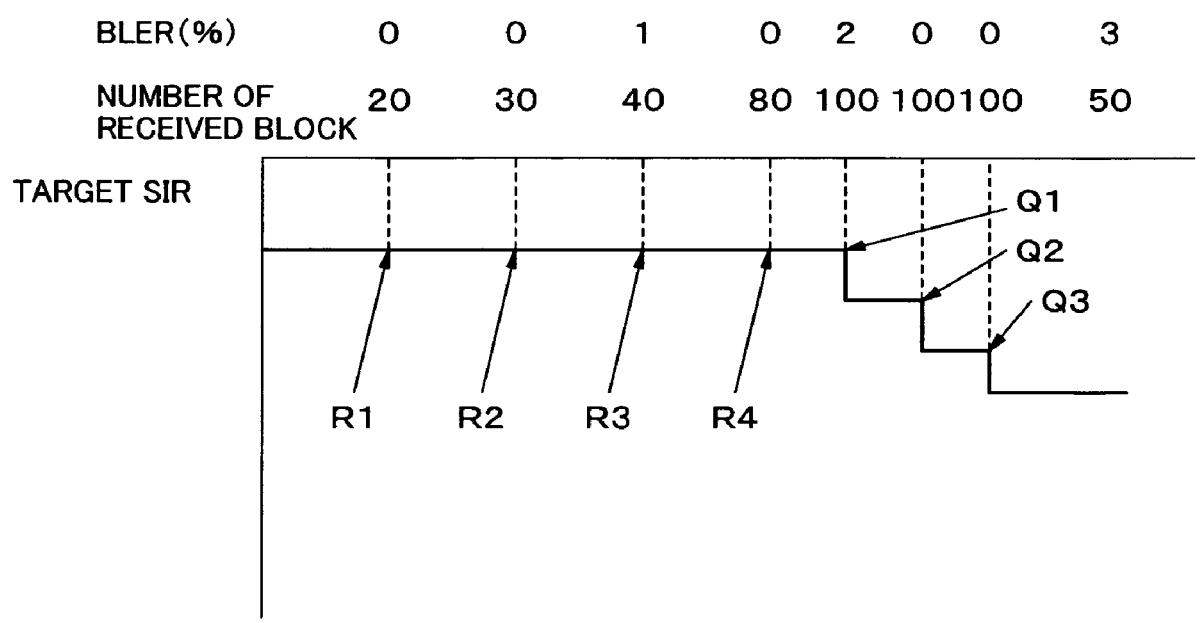
FIG. 5 illustrates an exemplary operation of a prior-art radio communication terminal.

With reference to FIG. 5, an exemplary operation of a prior-art radio communication terminal without the timer counter 20 is illustrated with a time chart. In this example, the number of the received blocks reaches 100 at Q1. Since the terminal does not have the timer counter 20, no comparison is made until Q1 between the quality of the received communication and the target communication quality. More specifically, at R1 through. R4 in FIG. 5 which correspond to P1 through P4 in FIG. 4, respectively, no comparison is made between the quality of the received communication and the target communication quality. Therefore, if the number of the received data is small, the target SIR is not decreased for a long time, and thus, the prior art radio communication terminal makes a request for an unnecessarily high transmission power to the base station.

Figure 6:
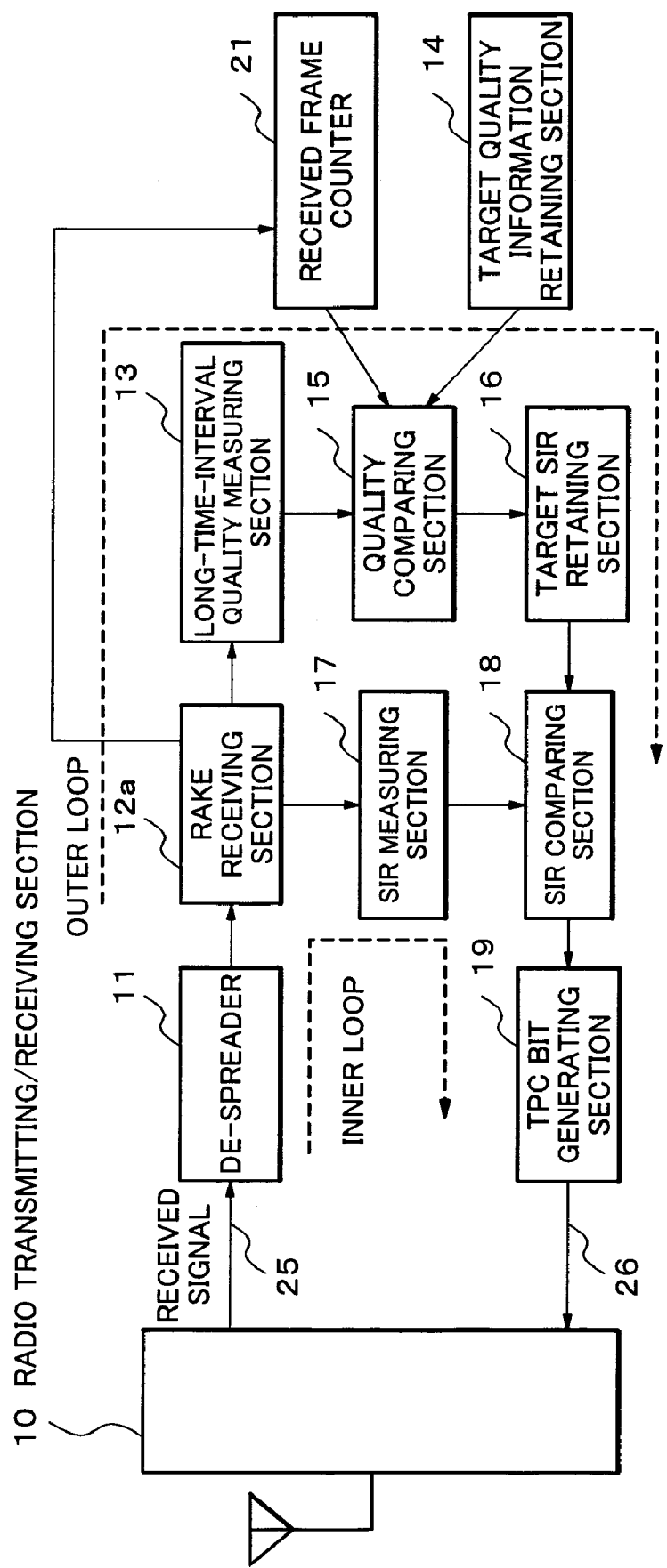
FIG. 6 is a block diagram of a radio communication terminal according to another embodiment of the present invention.

With reference to FIG. 6, a radio communication terminal according to another embodiment of the present invention is illustrated. In this example, the outer loop portion includes a received frame counter 21 instead of the timer counter 20. The RAKE receiving section 12a outputs received frames to the received frame counter 21. The received frame-counter 21 counts the number of the received frames, and when the counted number reaches a set number, notifies the quality comparing section 15 to that effect. The radio communication terminal with the received frame counter 21 can avoid miscount by the timer counter 20 due to misinstallation of related software.

Since the above-described radio communication terminal can decrease the target SIR even when the amount of the received data is small, it does not make a request for an unnecessarily high transmission power to the base station. Accordingly, interference with other terminals is decreased, and thus, the base station can increase the capacity of the communication system.

The above-described radio communication terminal may be, for example, a cellular phone, a personal handyphone system (PHS), a personal data assistance, or a personal digital assistant, and can be applied to a terminal device and system for conducting transmission power control.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

Further, it is the inventor's intent to refrain all equivalents of the claimed invention even if the claims are amended during prosecution.

What is claimed is:

1. A radio communication terminal for measuring a signal to interference power ratio (SIR) of a received signal, comparing the measured SIR with a target SIR, and transmitting to a base station transmission power control (TPC) information based on a result of the comparison, comprising:
a quality measuring section for measuring the communication quality of received data;
a quality comparing section for comparing the measured communication quality with a target communication quality;
a retaining section for retaining a target SIR updated based on a result of the comparison; and
a counter section for outputting a timing signal to the quality comparing section, wherein
the quality comparing section compares the target communication quality with the communication quality measured when a predetermined amount of data is received, and
the quality comparing section compares the target communication quality with the communication quality measured when a timing signal is received from the counter section.

2. A radio communication terminal according to claim 1, wherein output intervals of the timing signals are changed according to the result of the comparison performed by the quality comparing section.

3. A radio communication terminal according to claim 2, wherein the output intervals of timing signals are reduced when the measured communication quality is equal to or higher than the target community quality.

4. A radio communication terminal according to claim 1, wherein the counter section is reset after the target SIR is updated.

5. A radio communication terminal according to claim 1, wherein the counter section comprises a timer that outputs a timing signal at predetermined time intervals.

6. A radio communication terminal according to claim 1, wherein the counter section is a frame counter that outputs a timing signal every time a predetermined number of received frames are counted.

7. A radio communication terminal according to claim 1, wherein the target SIR is decreased when the measured communication quality is equal to or higher than the target communication quality.

8. A radio communication terminal according to claim 1, wherein the communication quality comprises a block error rate (BLER).

9. A radio communication terminal according to claim 1, wherein the quality comparing section updates the target SIR.

10. A radio communication terminal according to claim 1, wherein the retaining section updates the target SIR.

11. A radio communication terminal according to claim 1, wherein the radio communication terminal is one selected from the group consisting of a cellular phone, a personal handyphone system, a personal data assistant, and a personal digital assistants.

12. A transmission power control method for a radio communication terminal for transmitting to a base station transmission power control (TPC) information based on a result of the comparison between a signal to interference power ratio (SIR) of a received signal and a target SIR, comprising:
measuring the communication quality of the received data when a predetermined amount of data is received;
measuring the communication quality of the received data when a predetermined timing signal is received;
comparing the measured communication quality with a target communication quality; and
updating the target SIR based on a result of the comparison.

13. A transmission power control method according to claim 12, wherein the timing signal is outputted from a counter section in the radio communication terminal.

14. A transmission power control method according to claim 13, wherein the counter section is reset after updating of the target SIR.

15. A transmission power control method according to claim 12, wherein output intervals of timing signals are changed according to the result of the comparison between the measured communication quality and the target communication quality.

16. A transmission power control method according to claim 12, wherein the output intervals of timing signals are reduced when the measured communication quality is equal to or higher than the target community quality.

17. A transmission power control method according to claim 12, wherein the target SIR is decreased when the measured communication quality is equal to or higher than the target communication quality.

* * * * *